Sept. 2, 1924.  
A. STEURS  
1,507,524  
RECIPROCATING PUMP

Filed March 15, 1923

Inventor  
A. Steurs

Patented Sept. 2, 1924.

1,507,524

UNITED STATES PATENT OFFICE.

ARSÈNE STEURS, OF BOURGEOIS-RIXENSART, BELGIUM, ASSIGNOR TO VERSÉ MOULART & COMPAGNIE, OF BRUSSELS, BELGIUM, A CORPORATION OF BELGIUM.

RECIPROCATING PUMP.

Application filed March 15, 1923. Serial No. 625,297.

*To all whom it may concern:*

Be it known that I, ARSÈNE STEURS, a Belgian subject, residing at 18 rue du Caillou-Bourgeois-Rixensart, Belgium, have invented certain new and useful Improvements in Reciprocating Pumps, of which the following is a specification.

The present invention relates to reciprocating pumps and is more particularly applicable to pumps for inflating pneumatic tires, or for compressing air or other gases into a receptacle. The chief objects of this invention are to provide a pump simple in construction and efficient in operation, comprising only a very small number of parts and so designed that said parts will be easy to manufacture and can be produced at a very low cost.

According to this invention the cylinder and the crank case of the pump are cast in one piece. On the opposite side to the cylinder the crank case is provided with an aperture through which the piston and the other working parts of the pump may be introduced when the pump is being put together. The piston rod is secured at one end to the oscillating cross-pin of the piston and at its other end to a sleeve surrounding the crank pin, the crank shaft being journalled in the side wall of the crank case. The admission of the air or other fluid is preferably controlled by the piston itself, the fluid under pressure escaping through a simple check valve.

The above construction dispenses with joints and with screws, bolts, or other assembling parts, without interfering with the possibility of readily putting the parts together. Further the cross-pin of the piston bears on the body of the piston throughout its length so that during the compression stroke the stresses are distributed over a large contact surface whereby the wear of these parts is reduced.

Figure 1:
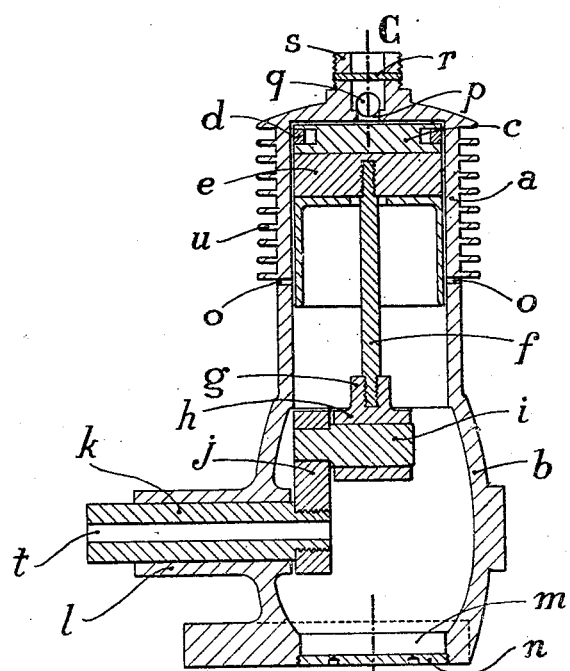
Figure 2:
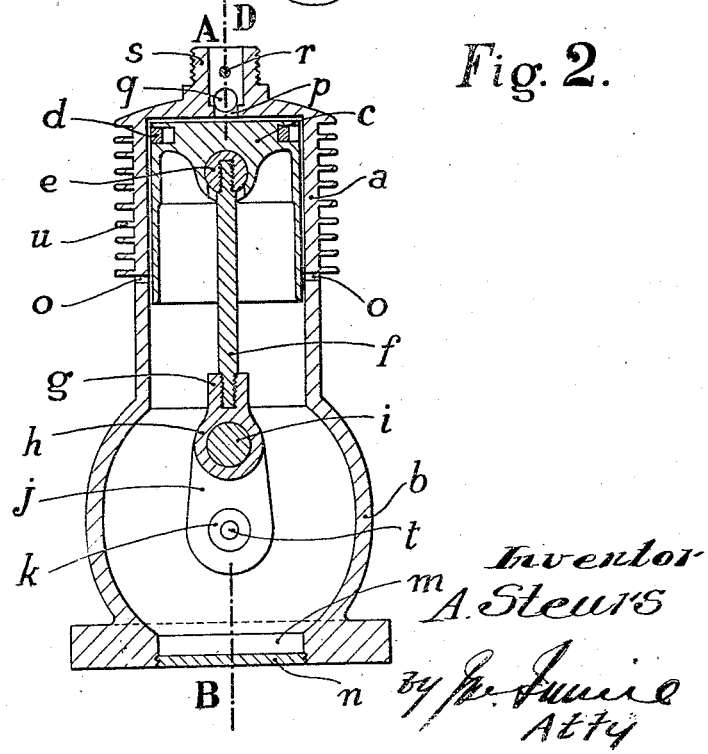

In the accompanying drawing which shows, by way of example, an embodiment of this invention, Figs. 1 and 2 are two vertical sections, on lines A—B of Fig. 2 and C—D of Fig. 1 respectively, of a pump for inflating tires.

The cylinder $a$ and crank case $b$ of this pump are made of one piece of cast metal. In the cylinder is adapted to reciprocate the piston $c$ provided with a packing ring $d$. In the body of the piston $c$ is mounted the oscillating cross-pin $e$ in which is screwed the upper end of the piston rod $f$. On the lower end of the rod $f$ is screwed an internally threaded socket $g$ integral with a sleeve $h$ surrounding the crank pin $i$. The crank pin is screwed in the crank $j$ which in turn is screwed on the crank shaft $k$ which is journalled in a bearing $l$, integral with the side wall of the crank case $b$. At its lower end, that is in the side opposite the cylinder, the crank case is provided with an opening $m$ the diameter of which is larger than that of the piston. This opening is normally closed by a plate $n$ screwed in the bottom of the crank case.

The cylinder $a$ is provided with lateral admission or suction ports $o$ which are controlled by the upper edge of the piston. At the top the cylinder has an axial outlet $p$ which is normally closed by a ball-shaped valve $q$ the movements of which are limited by a pin $r$. The nozzle $s$ is adapted to be connected to the receptacle into which air is to be compressed.

To put the pump together, the piston, the cross-pin $e$, the rod $f$ and the parts $h, i, j$ are first assembled and then introduced into the cylinder through the opening $m$, whereupon the shaft $k$ is shifted in the bearing $l$ and screwed into the crank $j$ in the direction of the rotation of the crank shaft.

The operation will be readily understood: The shaft $k$ being driven in any desired manner, the piston $c$ reaching the lower end of its stroke uncovers the ports $o$ through which air is admitted into the cylinder. When the piston rises this air is compressed until the pressure within the cylinder causes the valve $q$ to lift, the air under pressure then being forced into the tire or other receptacle to which the nozzle $s$ is connected.

In order to avoid an objectionable counter-pressure within the crank case, the shaft $k$ is made with an axial bore $t$ through which the crank case is connected with the outside air. This bore may also be used to introduce oil into the crank case. When the pump is in operation, the oil in the bottom of the crank case is beaten by the rotating crank and thrown against the inner walls of the cylinder thus producing an efficient lubrication of the working parts.

Undue heating of the parts is counteracted by the cooling effect of the suction on both sides of the piston, and if required, by the provision of a water jacket or of ribs $u$ cast in one piece with the cylinder.

It will be seen that the pump shown has neither joints nor screws, bolts or other assembling members, and that all the parts are of current design and easy to manufacture. Moreover, as the piston rod is rigidly connected to the crank pin $e$, the said pin may be arranged to bear throughout its length against the body of the piston so that the stresses during the compression stroke are distributed over a large surface.

It will be understood that two or more cylinders may be cast in one piece with the crank case and that other modifications may be adopted without departing from the scope of the invention.

I claim:

1. In a reciprocating pump, the combination of a cylinder and a crank case cast in one piece, a piston in said cylinder, a cross-pin mounted to oscillate in said piston and bearing throughout its length against said piston, a rod rigidly connected to said cross-pin, a crank shaft journalled in a side wall of said crank case and adapted to reciprocate said rod, said shaft having an axial bore connecting said crank case with the outside air, said crank case being provided with an opening having a larger diameter than said piston.

2. In a reciprocating pump, the combination of a cylinder and a crank case cast in one piece, a piston in said cylinder, a cross-pin mounted to oscillate in said piston and bearing throughout its length against said piston, a rod having one end screwed in said cross-pin, a sleeve screwed on the other end of said rod, a shaft journalled in a side wall of said crank case, said shaft having an axial bore, a crank screwed on said shaft, a crank pin screwed in said crank, said sleeve surrounding said crank pin, said crank case being provided at the bottom with an opening having a larger diameter than said piston, and a plate for closing said opening.

In testimony whereof I have affixed my signature.

ARSÈNE STEURS.